A. A. RITCHESON.
MOTOR VEHICLE BODY.
APPLICATION FILED OCT. 28, 1918.
1,293,199.
Patented Feb. 4, 1919.
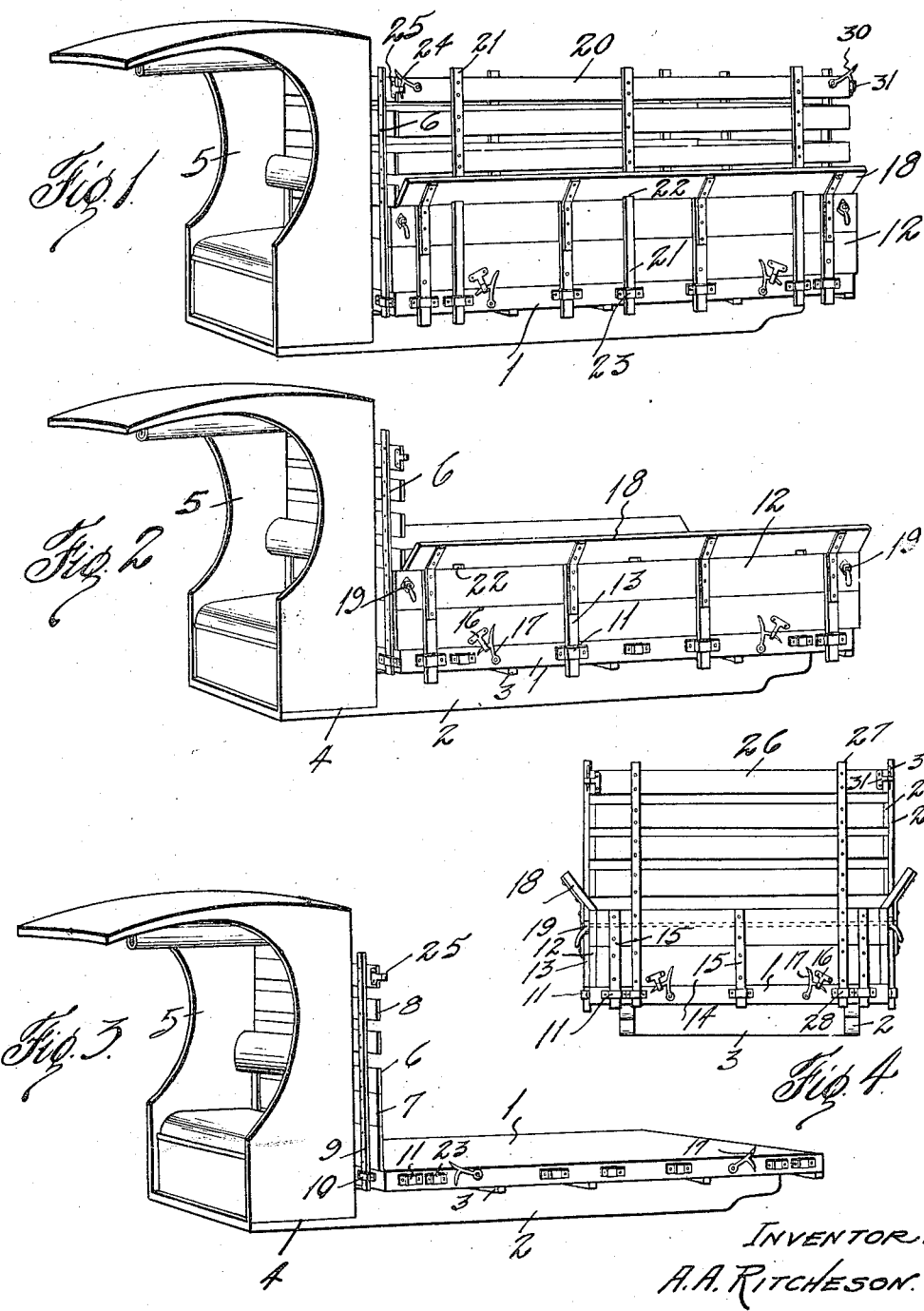
INVENTOR:
A. A. RITCHESON.

UNITED STATES PATENT OFFICE.

ALVIN A. RITCHESON, OF DALLAS, TEXAS.

MOTOR-VEHICLE BODY.

1,293,199.
Specification of Letters Patent.
Patented Feb. 4, 1919.

Application filed October 28, 1918. Serial No. 259,956.

*To all whom it may concern:*

Be it known that I, ALVIN A. RITCHESON, a citizen of the United States, residing at Dallas, in the county of Dallas and State of Texas, have invented certain new and useful Improvements in Motor-Vehicle Bodies, of which the following is a specification.

This invention relates to new and useful improvements in motor vehicle bodies.

The aim of this invention is to provide a convertible truck body combining three different forms in one general assembly.

In carrying out the invention a platform truck base is provided and may be used as an ordinary platform truck. Side-boards mounted on the platform are readily attached so as to convert the structure into an express body. For a farm truck panels are readily attached above the side-boards and a complete structure had. It will be seen that the parts must be readily convertible and easily assembled or disassembled or otherwise the result sought would not be obtained. Other features will be more particularly pointed out.

The invention will be more readily understood from a reading of the following specification and by reference to the accompanying drawings, in which an example of the invention is illustrated, and wherein—

Figure 1 is a perspective view showing the full assembled farm body,

Fig. 2 is a similar view with the panels removed to form an express body,

Fig. 3 shows the panels and side boards removed to form a platform truck, and

Fig. 4 is an end view of the assembly shown in Fig. 1.

In the drawings the numeral 1 designates a platform or base mounted on sills 2 and bolsters 3. The bolsters are let into and overhang the sills in the usual manner; the sills are notched out at 4 at their front ends to receive the usual cab 5. The platform 1 has its front end terminating at the cab and projects on each side of the same.

A fixed body section 6 is mounted at the front end of the platform and rests against the rear side of the cab. This body section comprises a lower solid portion 7 and an upper panel or a slotted portion 8 both portions being united by standards 9, the lower ends of which project below the section and engage in keepers 10 mounted on the front edge of the platform. This body section may be removed but I have called it a fixed section because it is left in place and not removed, as shown in Fig. 3.

For forming an express body keepers 11 are mounted along the side and the rear edges of the platform 1. Solid side-boards 12 are provided with stays 13 projecting below their lower edges and engaging in the keepers so that the boards rest on the platform. A tail-board 14 has stays 15 engaging in the keepers 11 at the rear. On the lower portion of the boards eyes 16 are mounted for receiving curved hooks 17 pivoted on the platform whereby the boards are fastened down as is obvious. The side-boards are provided along their top edges with flare-boards 18. Tie-rods 19 connect the side-boards and confine therebetween the portions of the front section and the tail-board 14. This gives the assembly shown in Fig. 2.

When a farm body is desired such as is used for hauling cotton, hogs or sheep, etc., side panels 20 are added. These side panels are slatted and secured to the upper ends of standards 21 which pass down through notches 22 in the flare-boards and engage in keepers 23 on the side edges of the platform. The panels register with the portion 8 of the front section and carry curved hooks 24 engaging eyes 25 on the front panel whereby the parts may be fastened together.

A tail-panel 26 is fastened to the upper ends of standards 27 which depend and enter keepers 28 on the rear edge of the platform. The panels vertically aline with the side and tail-boards and the side-panels rest on the flare-boards 18. These side panels carry curved hooks 30 at their rear ends engaging eyes 31 at the top and on each side of the tail-panel 26, as shown in Figs. 1 and 4.

It is obvious that starting with the full assembled body, as shown in Fig. 1, the structure may be quickly converted into the express body, as shown in Fig. 2, by simply disengaging the hooks 24 and 30 and removing the panels 20 and 26. Then should it be desired to convert the structure into a platform truck the hooks 17 are disengaged, the tie bolts 19 withdrawn, and the side-boards 12 and tail-board 14 quickly removed. It will be noted that it is not necessary to remove the front section 6 and this remains in position at all times and could be fastened to the cab if desired. However, if necessary the sections 6 can also be removed.

What I claim is,

1. In a convertible motor truck body, the combination of a fixed platform, a cab mounted at the front end of the platform, a front body section mounted on the platform at the rear of the cab, removable side and tail boards fastened on a platform, side and tail panels mounted immediately above the boards and independently removable, and means for fastening the removable boards and panels in place.

2. In a convertible truck body, the combination with a fixed platform having a cab mounted at its front end, and a front body section disposed against the rear of the cab and mounted on the front end of the platform, of removable side-boards mounted along the side edges of the platform, a removable tail-board mounted along the rear edge of the platform between the side boards, the side-boards and tail-board being suitably fastened together, independently removable panels disposed over the side-boards and having depending standards secured to the platform, an independently removable tail-panel disposed above the tail-board and having depending standards secured to the platform, and means for fastening the panels together and also for fastening the panels to the front section.

3. In a convertible truck body, the combination with a fixed platform having a cab mounted at its front end, and a removable front body section disposed against the rear of the cab and mounted on the front end of the platform, of removable side-boards mounted along the side edges of the platform, means for fastening the side-boards on the platform, a removable tail-board mounted along the rear edge of the platform between the side-boards, means for fastening the tail-board on the platform, the side-boards and tail-boards being suitably fastened together, independently removable panels disposed over the side-boards and having depending standards secured to the platform, and means for fastening the panels together and also for fastening the panels to the front section.

4. In a convertible truck body, the combination with a fixed platform, a front body section having depending standards, keepers on the front edge of the platform receiving the standards of the front section, of removable side boards resting on the platform and having stays depending over the edges of the platform, keepers on the edges of the platform receiving the stays, eyes on the side-boards, hooks on the edges of the platform engaging the eyes for fastening the side-boards in position, flare-boards mounted along the top edges of the side-boards, a tail-board mounted on the platform and having stays projecting over the rear edge of the platform, keepers on the rear edge of the platform receiving the stays of the tail-board, eyes on the tail-board, hooks on the platform engaging the eyes for fastening the tail-board in position, slatted side panels having depending standards passing through the flare-boards and over the side-boards to the platform, a second set of keepers mounted on the platform for receiving the standards, means for fastening the front body section and the side-panels together, a tail-panel having standards projecting downward over the tail-board, a second set of keepers mounted on the platform and receiving the standards of the tail-panel, eyes at each side of the upper portion of the tail-panel, and hooks mounted on the side panels and engaging the eyes to fasten said panels together.

In testimony whereof I affix my signature.

ALVIN A. RITCHESON.